F. GERARD.
Vehicle-Spring.
No. 209,247.  Patented Oct. 22, 1878.
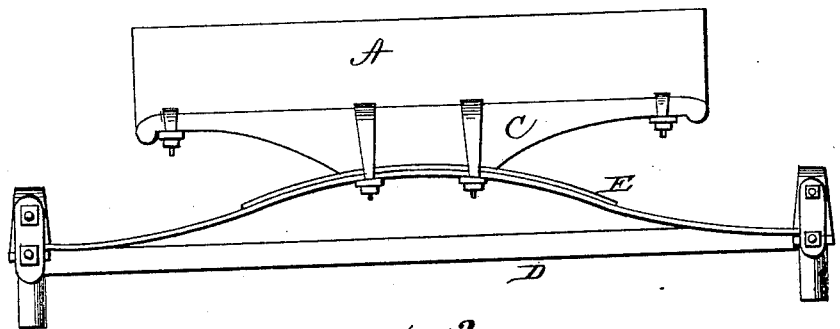
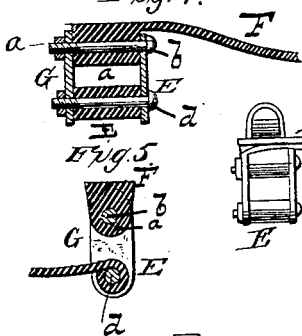
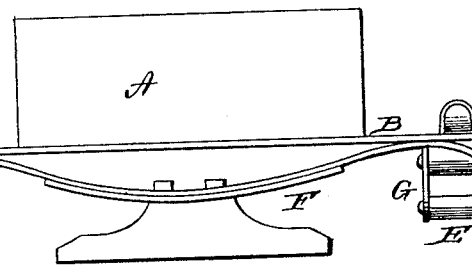
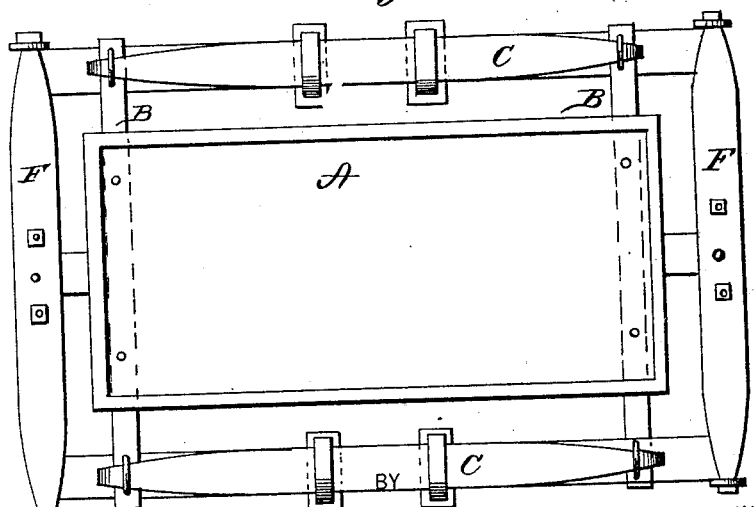

UNITED STATES PATENT OFFICE.

FRANK GERARD, OF LINCOLN, ILLINOIS.

IMPROVEMENT IN VEHICLE-SPRINGS.

Specification forming part of Letters Patent No. 209,247, dated October 22, 1878; application filed August 15, 1878.

*To all whom it may concern:*

Be it known that I, FRANK GERARD, of Lincoln, in the county of Logan, and in the State of Illinois, have invented certain new and useful Improvements in Vehicle-Springs; and do hereby declare that the following is a full, clear, and exact description thereof, reference being had to the accompanying drawings, and to the letters of reference marked thereon, making a part of this specification.

The nature of my invention consists in the construction and arrangement of the springs of a vehicle for giving ease and steadiness to the body, as will be hereinafter set forth.

To enable those skilled in the art to make and use my invention, I will proceed to describe its construction and operation.

In the accompanying drawings, making part of this specification, Figure 1 represents a side view, Fig. 2 an end view, and Fig. 3 a plan, of my invention. Figs. 4 and 5 are detailed sectional views, showing the coupling for connecting the springs.

In the figures, A represents the body of the vehicle. This body rests upon and is secured to the cross-bars B B. These cross-bars are secured at their ends to the ends of the spring-bars C C by means of suitable clips. The cross-bars C C are placed upon and secured by clips to the half-elliptic longitudinal leaf-springs E E.

F F represent two cross-springs, one of which is secured at front of the vehicle to the head-block and the other at rear to the bed-piece of the hind axle. The springs E and F are connected together at their ends by means of a coupling constructed in the following manner: At each end of each spring F is welded a tubular block, $a$, through which is passed a bolt, $b$, running in the same direction as the spring. On the ends of the bolt $b$ are hung the links G G, having a bolt, $d$, passed through their lower ends. This bolt $d$ runs parallel with the bolt $b$, and has the end of the spring E curled around it to form an eye, as shown in Fig. 5, thus completing the coupling or connection between the two springs F and E.

D represents the pinch-pole. The springs E and F may be composed of one or more leaves, according to the strength or elasticity required.

It will readily be seen that with this arrangement of side and end springs the body of the vehicle will be held in a level position, and will have imparted to it an easy elasticity which cannot well be gained in any other manner.

I am aware that it is not new to arrange two transverse end springs with two longitudinal side springs connected at their ends by couplings, and therefore I do not claim such, broadly, as my invention.

Having thus fully described my invention, what I claim as new, and desire to secure by Letters Patent, is—

The combination of the end spring, F, having a perforated block, $a$, welded to it at the end, the bolt $b$, links G G, bolt $d$, and the spring E, having its end curled around the bolt $d$, substantially as herein set forth.

In testimony that I claim the foregoing I have hereunto set my hand this 5th day of July, 1878.

FRANK GERARD.

Witnesses:
L. B. DAVIS,
G. D. CORWINE.